United States Patent
Benisty

(10) Patent No.: US 12,353,766 B2
(45) Date of Patent: Jul. 8, 2025

(54) FAIRNESS AND CONSISTENCY IN MULTI-FUNCTION NONVOLATILE MEMORY (NVM) EXPRESS (NVME) DEVICE (MFND)

(71) Applicant: Western Digital Technologies, Inc., San Jose, CA (US)

(72) Inventor: Shay Benisty, Beer Sheva (IL)

(73) Assignee: Sandisk Technologies, Inc., Milpitas, CA (US)

(*) Notice: Subject to any disclaimer, the term of this patent is extended or adjusted under 35 U.S.C. 154(b) by 72 days.

(21) Appl. No.: 18/461,779

(22) Filed: Sep. 6, 2023

(65) Prior Publication Data

US 2025/0077117 A1    Mar. 6, 2025

(51) Int. Cl.
G06F 3/06    (2006.01)

(52) U.S. Cl.
CPC .......... G06F 3/0659 (2013.01); G06F 3/0604 (2013.01); G06F 3/0679 (2013.01)

(58) Field of Classification Search
CPC ...... G06F 3/0659; G06F 3/0679; G06F 3/061; G06F 3/0688; G06F 3/0604
USPC .......................................... 711/154, 103, 170
See application file for complete search history.

(56) References Cited

U.S. PATENT DOCUMENTS

| | | | |
|---|---|---|---|
| 8,595,385 B1 | 11/2013 | Shapiro et al. | |
| 9,317,204 B2 | 4/2016 | Hahn et al. | |
| 9,927,983 B2 | 3/2018 | Benisty et al. | |
| 10,203,912 B2 | 2/2019 | Jun et al. | |
| 11,126,375 B2 | 9/2021 | Zhu et al. | |
| 2017/0031619 A1* | 2/2017 | Luan ..................... | G06F 3/0673 |
| 2023/0161504 A1* | 5/2023 | Nagasaka ............. | G06F 3/0607 |
| | | | 711/154 |
| 2023/0280941 A1* | 9/2023 | Agrawal ............... | G06F 3/0659 |
| | | | 711/154 |
| 2024/0168681 A1* | 5/2024 | Helmick ............... | G06F 3/0679 |

OTHER PUBLICATIONS

Kang, Luyi., Tackling Performance and Security Issues for Cloud Storage Systems, University of Maryland, College Park, ProQuest Dissertations & Theses (Year: 2022).*

* cited by examiner

*Primary Examiner* — Jared I Rutz
*Assistant Examiner* — Edward Waddy, Jr.
(74) *Attorney, Agent, or Firm* — Patterson + Sheridan, LLP

(57) ABSTRACT

Contents of the next commands are considered as part of an arbitration between virtual functions (VFs). The device controller will hold the head of the submission queues (SQ) internally. The controller is able to do so by implementing a small first in first out (FIFO) per submission queue. The second arbiter and the main arbiter, which is responsible for the command scheduling, fetches the commands from the internal small FIFO. Using this technique, the second arbiter gains visibility of the next commands that participate in the arbitration since the next commands are held internally and not in host memory.

19 Claims, 10 Drawing Sheets

FAIRNESS AND CONSISTENCY IN MULTI-FUNCTION NONVOLATILE MEMORY (NVM) EXPRESS (NVME) DEVICE (MFND)

BACKGROUND OF THE DISCLOSURE

Field of the Disclosure

Embodiments of the present disclosure generally relate to improving knowledge of next command content in SSDs.

Description of the Related Art

One of the use cases of a Multi-Function NVMe Device (MFND) is where the solid state drive (SSD) is shared across multiple tenants (i.e., virtual memory (VM) hosts) without any hypervisor layer between the SSD and host. The device is able to communicate with the hosts, but the device thinks the interaction across an interface is with a single host rather than multiple hosts. There are a variety of optimizations around memory usage that can be done when the host implements page movement capabilities.

The primary use case for a MFND is to enable an SSD to be partitioned up (in term of capacity and performance) across multiple VM tenants. The basic SSD partitioning is enabled by the SSD presenting multiple PCIe physical functions (PF) with each VM having direct access to a personal PF. In other words, there is no hypervisor software layer between the VM and the SSD. The PF0 in most cases is always the "parent controller", which performs administration such as assigning resources or migration. The host hypervisor software in most case is the only feature allowed to communicate with the "parent controller" PF. Each VM will have a personal dedicated "child controller" PF interface into the SSD, with personal dedicated resources.

To support quality of service (QoS), fairness, consistency and bandwidth variation requirements, a device controller must fetch the commands from multiple submission queues (SQ) while considering the resources and migration. One aspect that is considered in this algorithm is that the device does not know in advance what will be the content of the command that is going to be fetched. This lack of knowledge influences the results.

Therefore, there is a need in the art for improving knowledge of next commands for MFNDs in SSDs.

SUMMARY OF THE DISCLOSURE

Contents of the next commands are considered as part of an arbitration between virtual functions (VFs). The device controller will hold the head of the submission queues (SQ) internally. The controller is able to do so by implementing a small first in first out (FIFO) per submission queue. The second arbiter and the main arbiter, which is responsible for the command scheduling, fetches the commands from the internal small FIFO. Using this technique, the second arbiter gains visibility of the next commands that participate in the arbitration since the next commands are held internally and not in host memory.

In one embodiment, a data storage device comprises: a memory device; and a controller coupled to the memory device, wherein the controller is configured to: determine that at least one host submission queue (SQ) is not empty; determine that at least one device side SQ has room for at least one entry; determine from which host SQ to retrieve an entry; retrieve at least one entry from the host SQ; place the at least one entry in a device side SQ; determine that a command context slot is open; determine from which device side SQ to retrieve an entry; retrieve an entry from the determined device side SQ; and place the entry in an open command context slot. The determining from which host SQ to retrieve an entry comprises arbitrating between multiple host SQs. The arbitrating comprises populating commands in device side SQs using a first in first out (FIFO) criteria. The controller is configured to parse the at least one retrieved entries from the host SQ. The parsing occurs prior to determining from which device side SQ to retrieve an entry. The parsing comprises obtaining one or more of the following: command type, namespace, logical block address (LBA), transfer size, command priority, special flag, metadata, or security parameters. The determining from which device side SQ to retrieve an entry comprises arbitrating between multiple device side SQs. The arbitrating is based upon parsing of the at least one retrieved entries. The controller comprises a host interface module (HIM). The HIM comprises a command parser, the device side SQs, a first arbiter, and a second arbiter. The first arbiter is configured to perform the determining from which host SQ to retrieve an entry. The second arbiter is configured to perform the determining from which device side SQ to retrieve an entry.

In another embodiment, a data storage device comprises: a memory device; and a controller coupled to the memory device, wherein the controller includes a host interface module (HIM) having a plurality of device side submission queues (SQs), a first arbiter, a second arbiter, and a command parser, wherein the controller is configured to: maintain the plurality of device side SQs that contain each portions of host side SQs, wherein a host SQ, from a host device's perspective, includes entries from the host side SQ and entries from the device side SQ; parse entries in the device side SQ; and arbitrate retrieving entries from the device side SQ based upon the parsing. The first arbiter is distinct from the second arbiter. The first arbiter is configured to operate on a weighted round robin (WRR) strategy. A number of device side SQs is equal to a number of host side SQs. The second arbiter has access to results of the parsing and the first arbiter does not have access to the results of the parsing.

In another embodiment, a data storage device comprises: means to store data; and a controller coupled to the means to store data, wherein the controller is configured to: perform a first arbitration to retrieve less than all entries from a plurality of host side submission queues (SQs), wherein the first arbitration is performed by a first arbiter; place retrieved entries in device side SQs; perform a second arbitration to retrieve an entry from the device side SQs, wherein the second arbitration is performed by a second arbiter distinct from the first arbiter; and place the entry in an open command context slot. The controller is configured to perform parsing of the retrieved entries placed in the device side SQs prior to performing the second arbitration. The controller is configured to turn off an ability to perform the first arbitration, place the retrieved entries, perform the second arbitration, and place the entry in the open command context slot.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Contents of the next commands are considered as part of an arbitration between virtual functions (VFs). The device controller will hold the head of the submission queues (SQ) internally. The controller is able to do so by implementing a small first in first out (FIFO) per submission queue. The second arbiter and the main arbiter, which is responsible for the command scheduling, fetches the commands from the internal small FIFO. Using this technique, the second arbiter gains visibility of the next commands that participate in the arbitration since the next commands are held internally and not in host memory.

Figure 1:
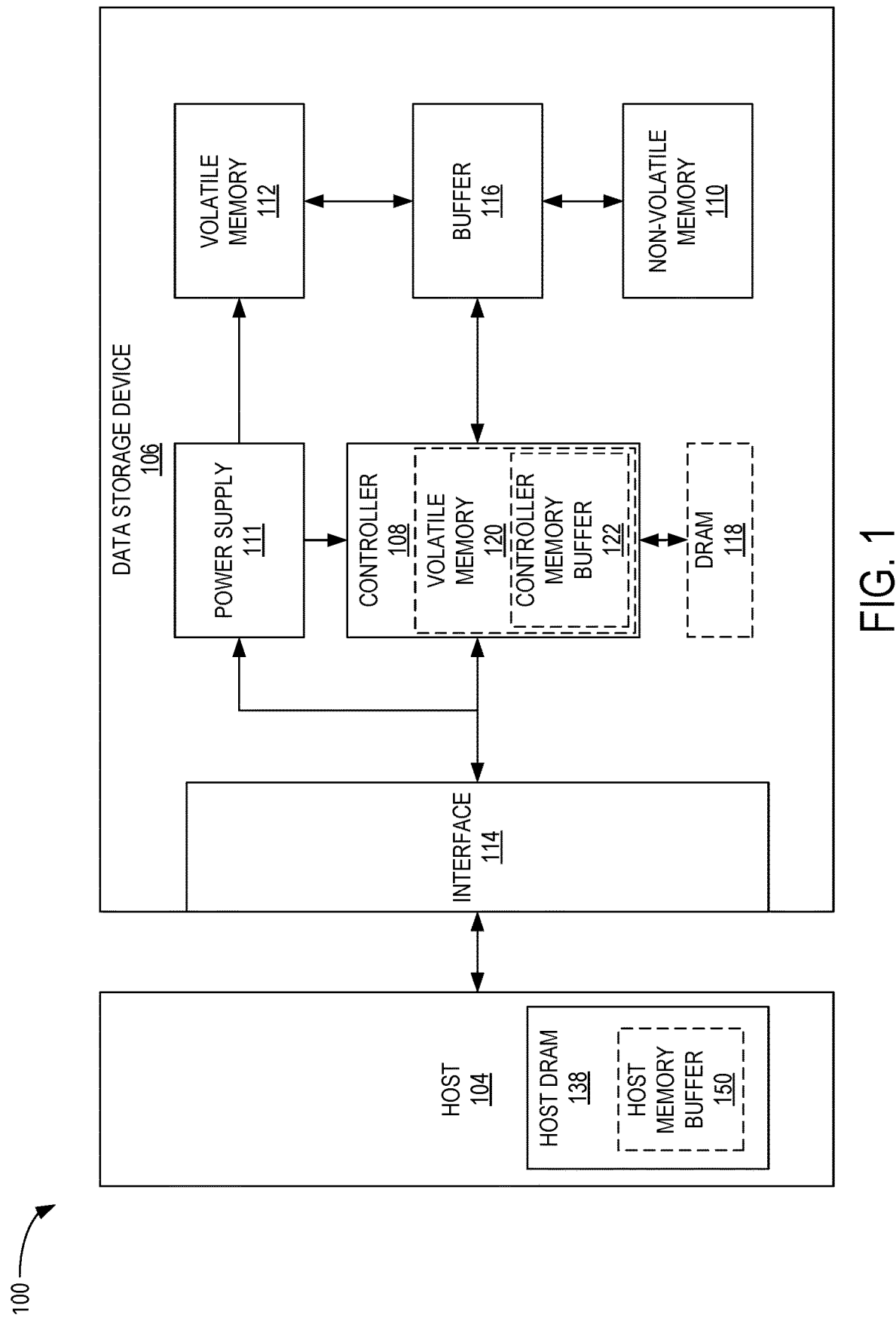
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128MB, 256MB, 512MB, 1GB, 2GB, 4GB, 8GB, 16GB, 32GB, 64GB, 128GB, 256GB, 512GB, 1TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
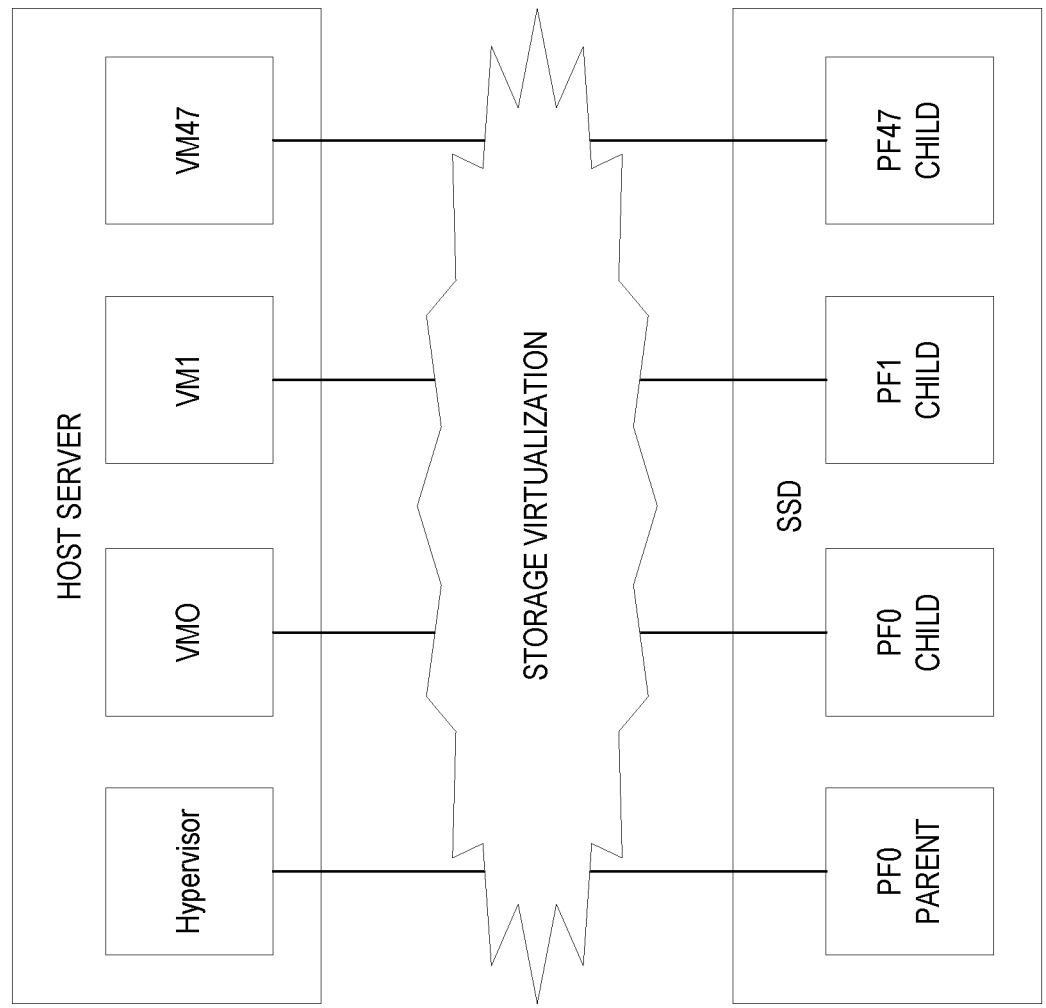
FIG. 2 is a block diagram illustrating a MFND system, according to one embodiment.

FIG. 2 is a block diagram illustrating a MFND system 200, according to one embodiment. The host server incorporates a hypervisor that is logically connected to a physical function (PF) parent and multiple virtual machines (VM) that are logically connected to multiple PF children. The link between each VM and PF is a single link, but virtually there can be multiple links. The VMs are used for the data transfer and each VM is treated as a different host. Any VM can generate a local reset or shutdown events (for example doing a VM reboot) at any time. Of course, the individual reset of each VM cannot impact all the other VMs running on that SSD so there should be isolation of these reset or shutdown events to a specific PF. Each PF is a separate NVMe controller within the SSD subsystem. Performing a PCIe Function Level Reset (FLR) or an NVMe Controller Reset or NVMe Shutdown to a PF will ONLY impact that PF and will have no effect on all the other PFs.

Currently MFND provisions up to 100% of the SSD capacity and performance across the child PFs (does not over-provision). Each child PF will have dedicated resources assigned to each child PF, and the hypervisor can allocate spare capacity or performance that is not already allocated to other child PFs.

Figure 3:
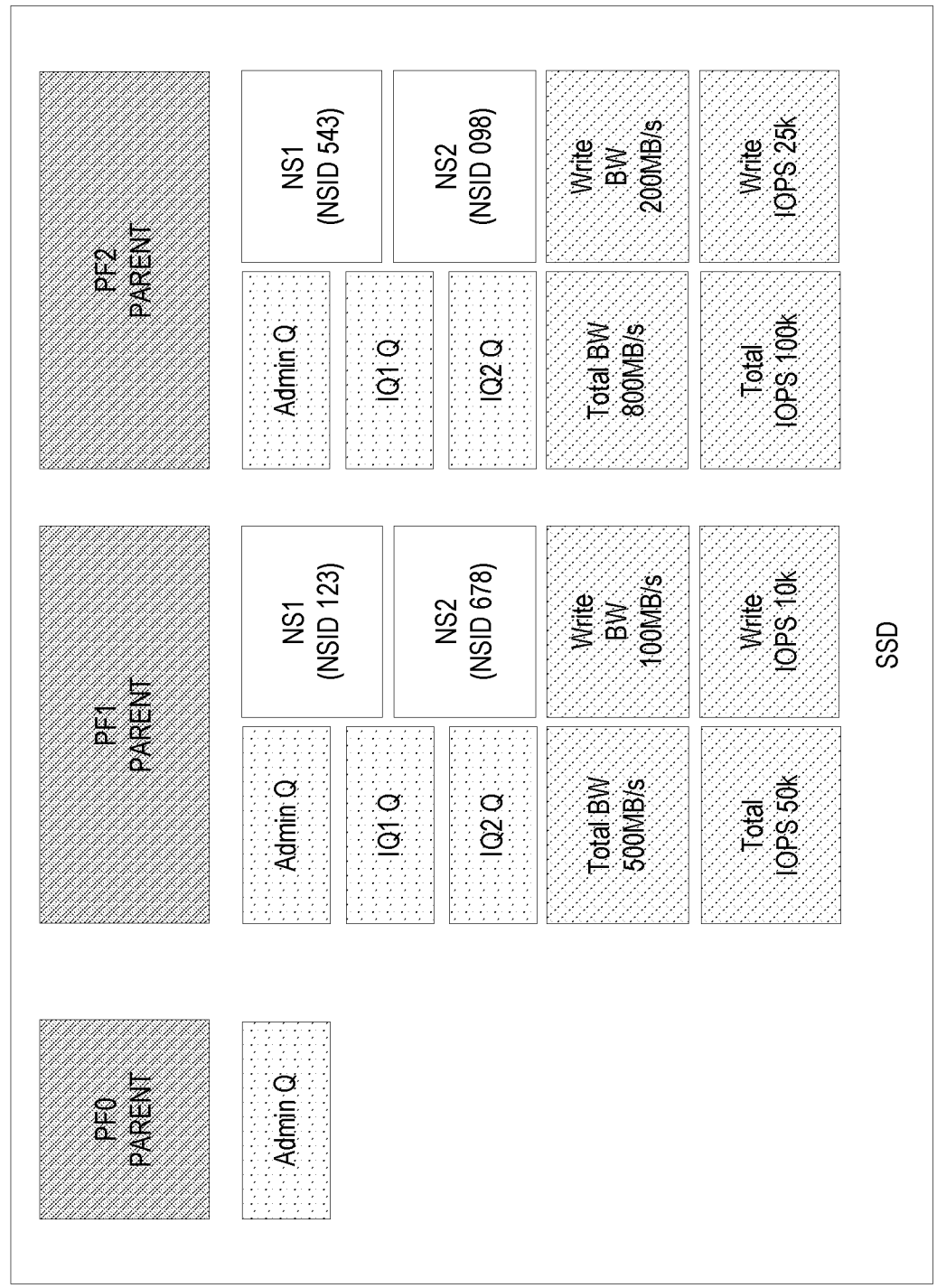
FIG. 3 is a block diagram illustrating a MFND system depicting resource allocation, according to one embodiment.

FIG. 3 is a block diagram illustrating a MFND system 300 depicting resource allocation, according to one embodiment. For each child PF, at the initialization phase the host of the MFND system 300 allocates capacity for queues and performance requirements in MB/Sec and input/output operations (IOP). The MFND system 300 further allocates queues for each one of PFs. For example admin queues, IO queues, and both submission and completions. The MEND system 300 also allocates storage such as namespace 1 and namespace 2 and the same for the second child. Bandwidth is also allocated for both sequential and random read performance and write performances.

Bandwidth variation is permitted, but bandwidth variation may be limited based upon time windows. For example, for a time window of 10 ms, the data storage device should be within 20% of bandwidth variation to meet performance requirements. For 100 ms, the data storage device should be within 15% of bandwidth variation to meet performance requirements. For 200 ms, the data storage device should be within 10% of bandwidth variation to meet performance requirements. For 500 ms, the data storage device should be within 5% of bandwidth variation to meet performance requirements. For 1000 ms, the data storage device should be within 2% of bandwidth variation to meet performance requirements.

To support QoS, fairness, consistency, and bandwidth variation requirements, the device controller must fetch the commands from the multiple submission queues in a smart way while considering those parameters.

Figure 4:
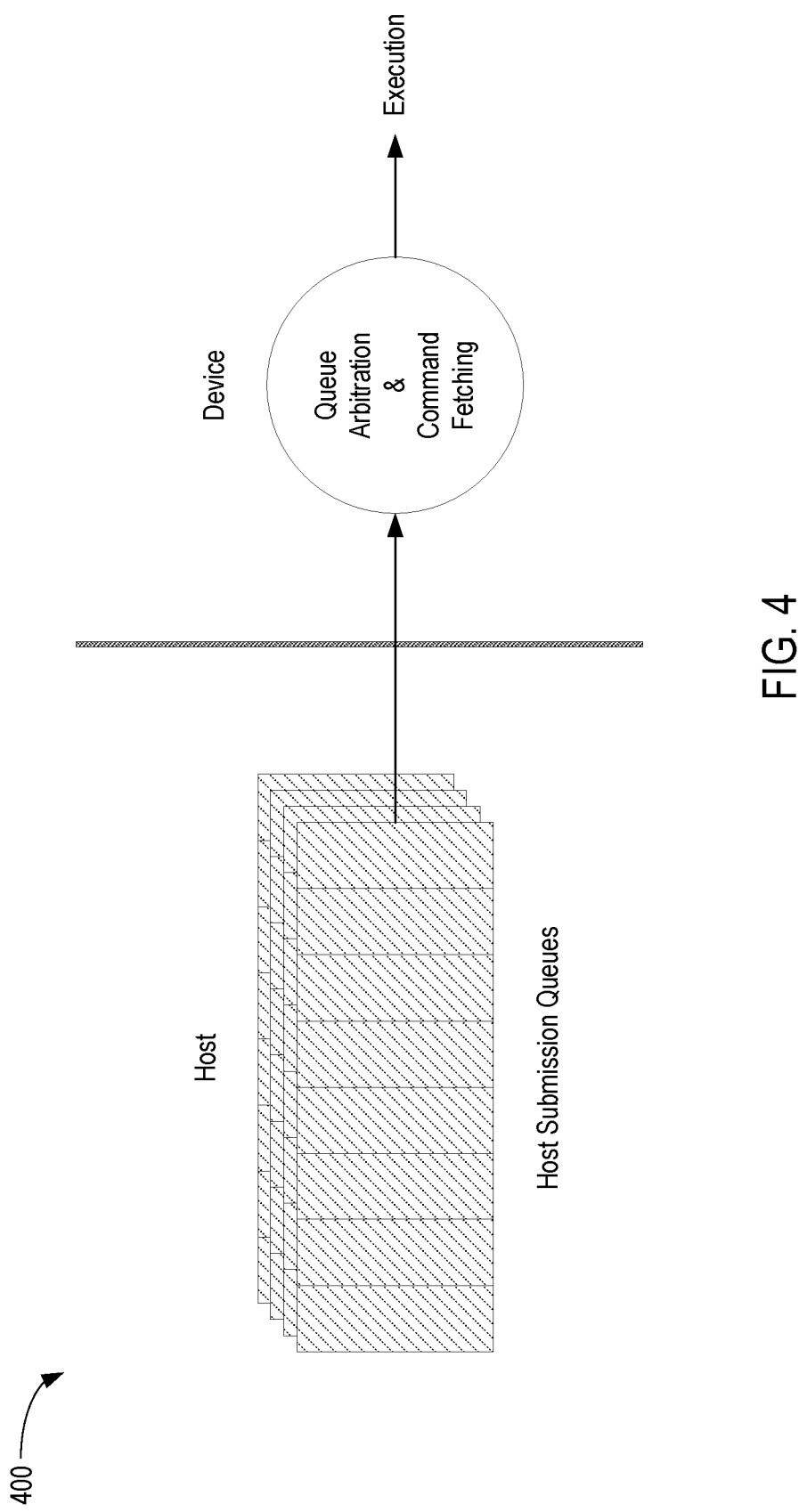
FIG. 4 is a diagram illustrating a system for fetching and execution of next commands without knowledge of command content.

FIG. 4 is a diagram illustrating a system 400 for fetching and execution of next commands without knowledge of command content. This lack of knowledge influences the QoS, fairness, and consistency results. The system 400 has a host with host SQs and the device is responsible for fetching commands from the multiple host SQs. To fetch the multiple host SQs from the host, the device controller implements queue arbitration, where the arbitration may be round Robin or weighted round Robin for example. After selecting the winner, the device controller will go and fetch the command from the winning SQ. The device controller will begin the execution phase. The issue is that the system 400 is trying to achieve fairness, but also the system 400 selects the next command for execution without knowing what would be in the next command.

Figure 5:
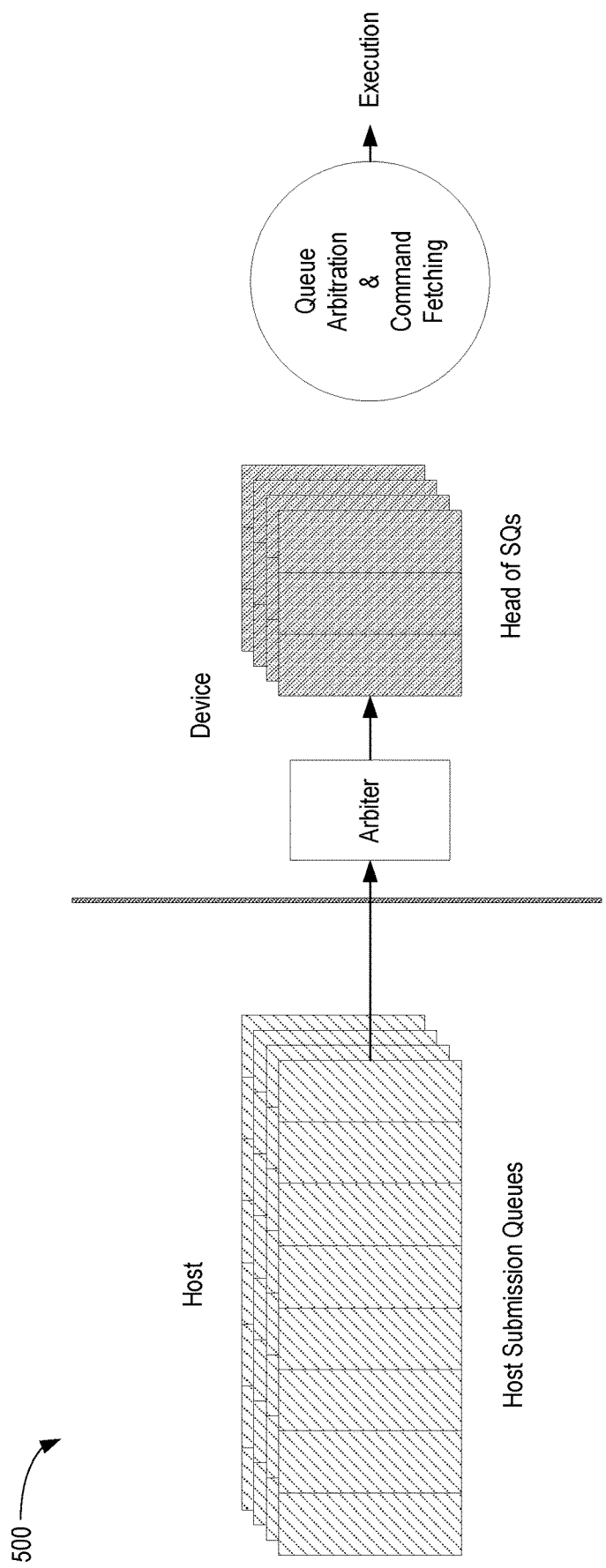
FIG. 5 is a diagram illustrating a system for fetching and execution of next commands with knowledge of command content, according to one embodiment.

FIG. 5 is a diagram illustrating a system 500 for fetching and execution of next commands with knowledge of command content, according to one embodiment. The device controller holds the head of the SQs internally. The device controller holds the head of SQs internally by implementing a small FIFO per SQ. Commands first access an arbiter before the small FIFO. The arbiter is responsible for fetching the next commands from the SQs and putting them in the internal FIFOs. Whenever the small FIFO is not full and the associated SQ is not empty, at least one command is fetched and stored internally. The second, and main arbiter which is responsible for the command scheduling, fetches the commands from the internal small FIFO. Using the new technique, the second arbiter gains visibility of the next commands that participate in the arbitration since the next commands are held internally and not in host memory.

The system 500 shows up to three entries in head of SQs implemented in the device, but on the host side there are many more entries. It is to be understood that three entries is merely an example as additional or fewer entries are contemplated. The system 500 will make sure that if there is a command on the host side, then there will be room in the in the head of SQs on the device side for the command to be placed in the device controller. This will affect performance and fairness because the candidate for execution will be the command that is allowed to be executed from a fairness point of view.

In another embodiment, the latency is important especially in low-queue depth. For low-queue depth scenarios, when the internal FIFOs are empty, the new arrived commands may skip the internal FIFO stage and go directly to the execution phase. Skipping the internal FIFO stage in some case will reduce the latency.

Figure 6:
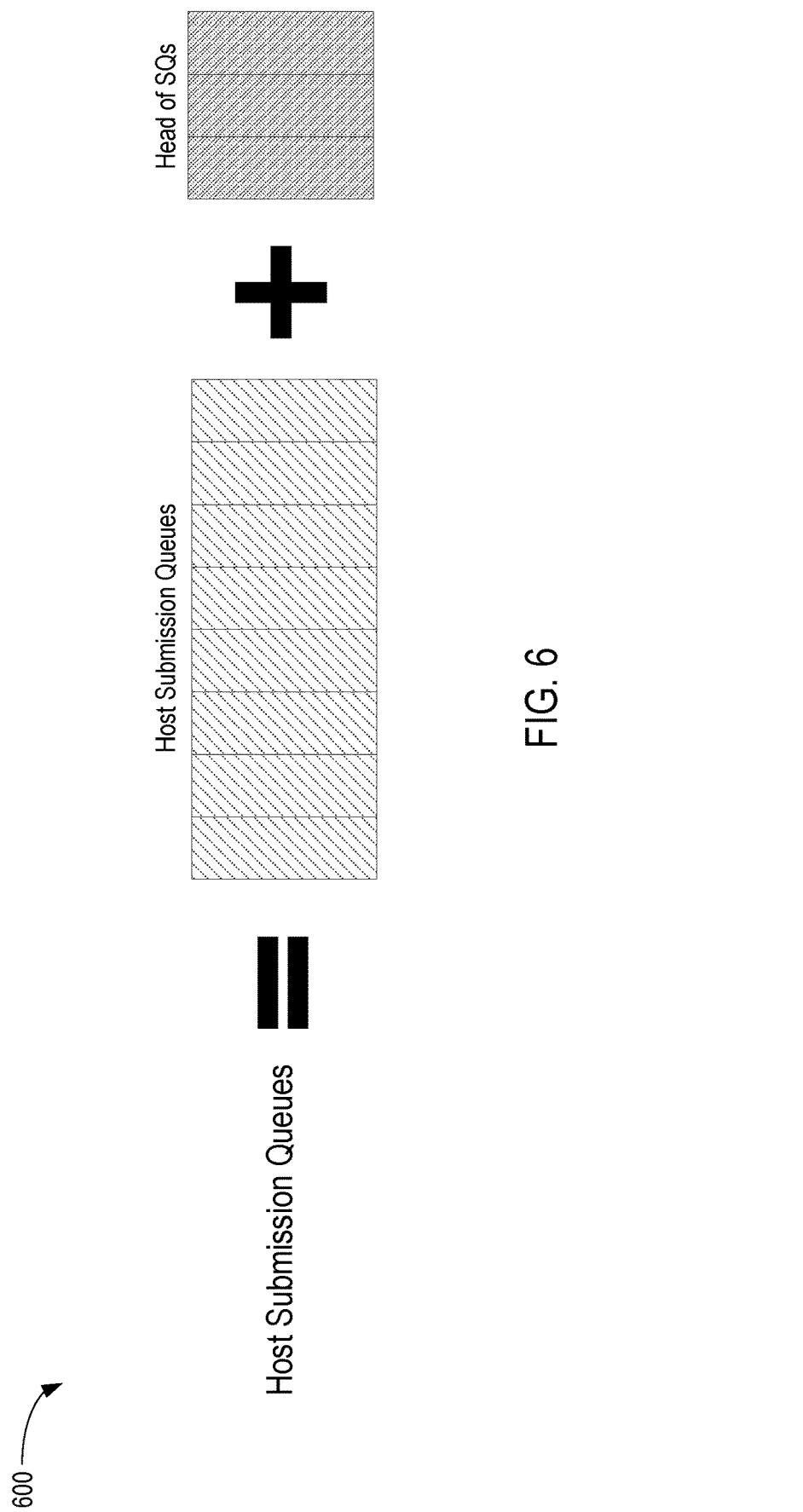
FIG. 6 is a diagram illustrating a logical view for a submission queue, according to one embodiment.

FIG. 6 is a diagram illustrating a logical view 600 for a submission queue, according to one embodiment. The SQ in the logical view 600 is the host SQ plus the head of SQs. The head of SQs will hold internally the type of command to gain some knowledge of the command before taking the command to the execution phase.

Figure 7A:
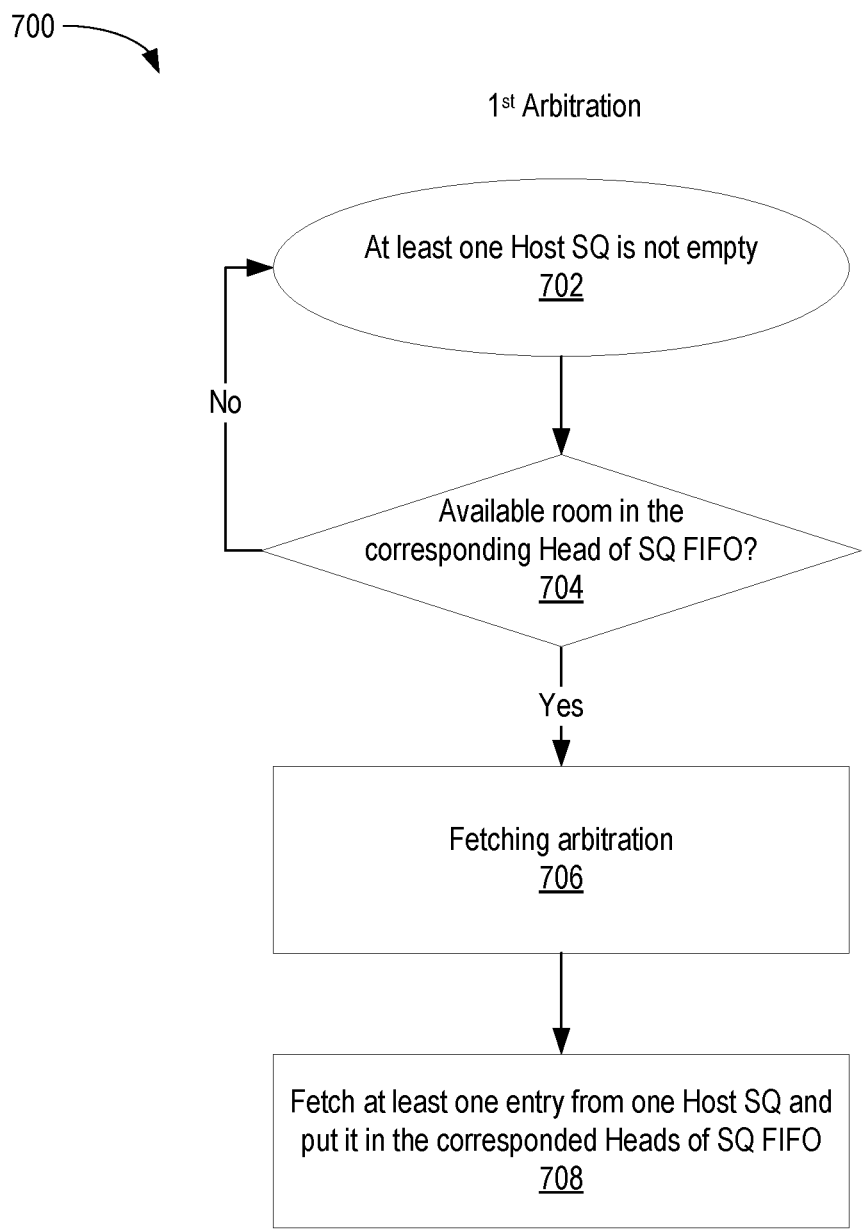
FIG. 7A is a flowchart illustrating a method for a first arbitration scheme, according to certain embodiments.

FIG. 7A is a flowchart illustrating a method 700 for a first arbitration scheme, according to certain embodiments. The first type of the arbitration is for fetching commands from the host SQs implemented in the host DRAM. Also the first type arbitration is used to fetch commands from host SQs and store them in the small queues that are in the device controller.

The first arbitration logic is utilized for populating the commands in the internal small FIFO. The first arbiter is triggered when at least one host SQ is not empty and the corresponding internal small FIFO is not full. In that case, the first arbiter is activated considering all SQs have met the above criteria. The logic will fetch at least one command for the winner SQ and queue the command in the associated internal small FIFO. The arbiter prioritizes the SQs based on the available room in the internal FIFOs. The higher available room, the higher the priority. Queue static priority and available entries in the host SQ are also considered.

The method 700 for the first arbitration begins at block 702. At block 702, at least one host SQ is not empty. At block 704, a controller, such as controller 108 of FIG. 1, determines whether there is available room in the corresponding head of SQ FIFO. If the controller determines that the there is no available room, then the method 700 returns to block 702. If the controller determines that there is available room, then the method 700 proceeds to block 706. At block 706, fetching arbitration begins. At block 708, the controller fetches at least one entry from one host SQ and in parallel puts the entry in a corresponding heads of SQ FIFO.

Figure 7B:
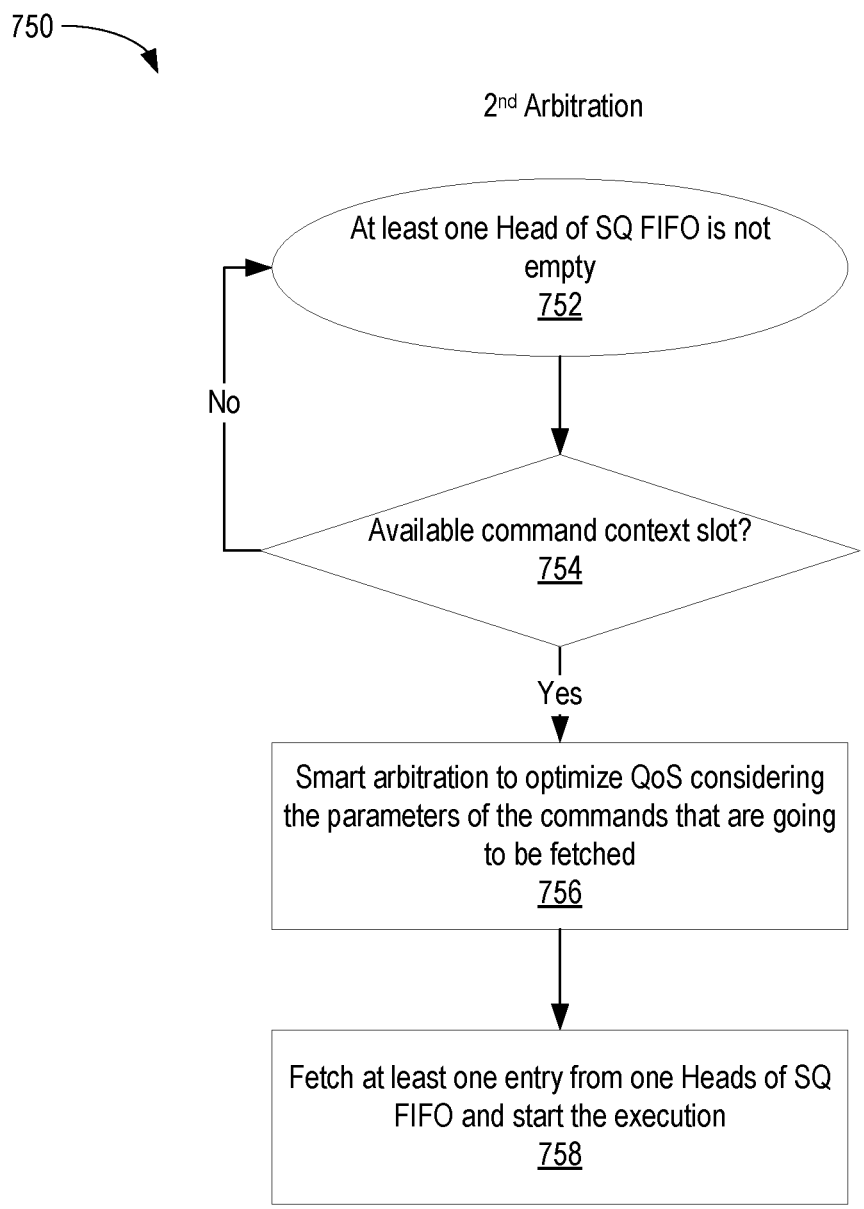
FIG. 7B is a flowchart illustrating a method for a second arbitration scheme, according to certain embodiments.

FIG. 7B is a flowchart illustrating a method 750 for a second arbitration scheme, according to certain embodiments. The second arbitration logic is responsible for fetching commands from the internal small FIFO and scheduling the commands. The second arbiter is triggered when at least one command is pending in the internal small FIFO and there is an available command context slot. The second arbiter is the main scheduler in the system since the second arbiter determines the next commands that are going to be executed. To make smarter decisions, the second arbiter also considers the content of the commands held in the internal small FIFO. The first arbiter cannot consider the content of the commands since the commands are held in host memory and are unknown prior fetching.

The method 750 for the second arbitration begins at block 752. At block 752, at least one head of SQ FIFO is not empty. At block 754, a controller, such as controller 108 of FIG. 1, determines whether there is an available command context slot. If the controller determines that the there is no available command context slot, then the method 750 returns to block 752. If the controller determines that there is an available command context slot, then the method 750 proceeds to block 756. At block 756, smart arbitration begins to optimize QoS considering the parameters of the commands that are going to be fetched. At block 758, the controller fetches at least one entry from one head of SQ FIFO and starts the execution. Command parameters that may be parsed and used in the arbitration scheme include but not limited to command type (e.g. read, write, erase, etc.), namespace and logical block address (LBA), transfer size, command priority, special flags (e.g. Force Unit Access) cache disabled for lite commands, metadata, and security parameters.

Figure 8:
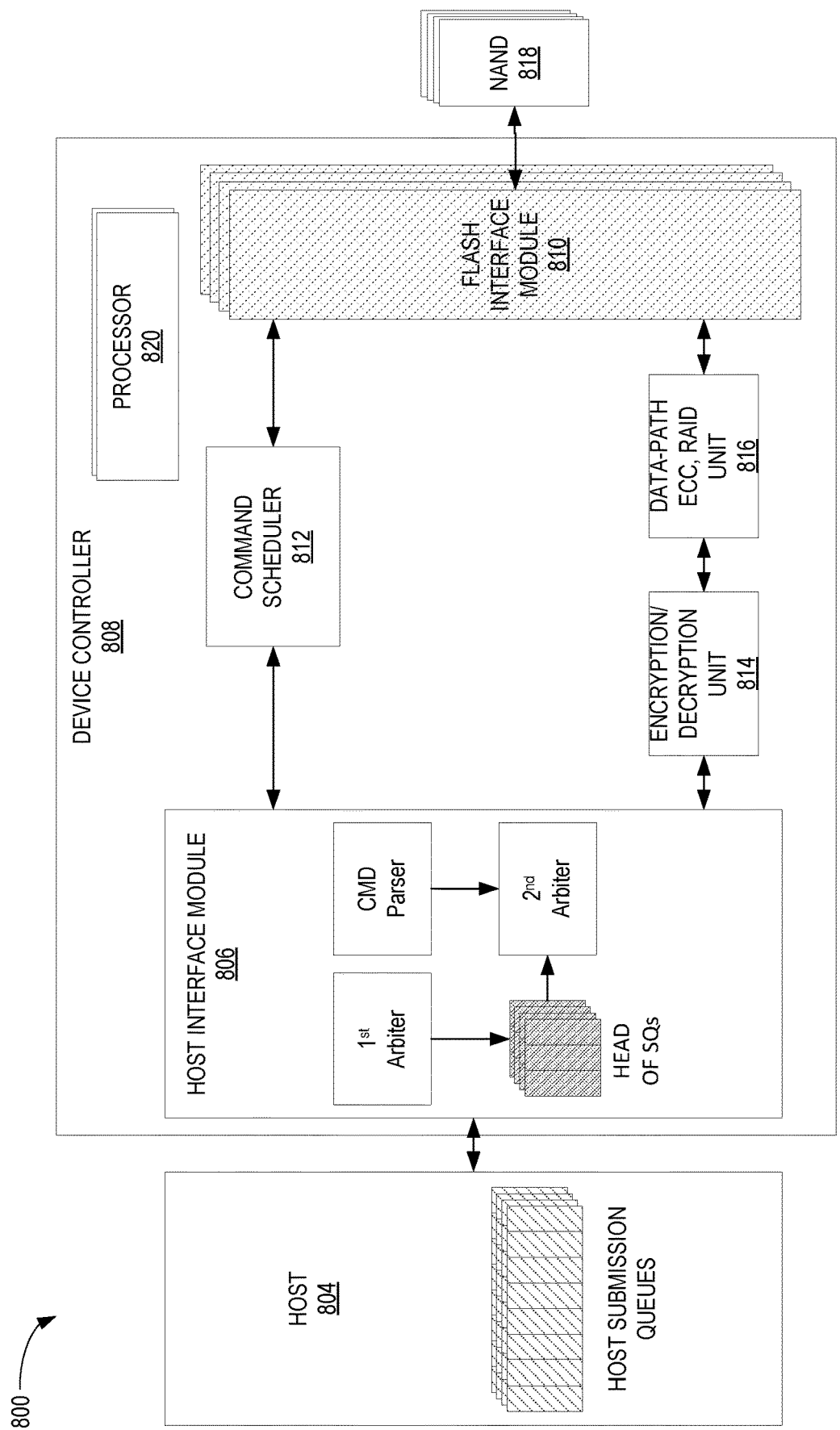
FIG. 8 is a diagram illustrating a MFND system for fetching and execution of next commands with knowledge of command content, according to one embodiment.

FIG. 8 is a diagram illustrating a MFND system 800 for fetching and execution of next commands with knowledge of command content, according to one embodiment. The MFND system 800 comprises a host 804, a device controller 808, and a memory device (e.g., NAND) 818. The host 804 further comprises host SQs. The device controller further comprises a host interface module (HIM) 806, a plurality of flash interface modules (FIM) 810, a command scheduler 812, an encryption/decryption unit 814, a data-path, ECC, RAID unit 816, and a plurality of processors 820. The HIM 806 further comprises a first arbiter, a second arbiter, a command parser, and storage for the head of SQs.

The host 804 creates and manages the host SQs in the host's 804 own memory. The device controller 808 implements a small FIFO per SQ while the FIFO always holds the few head commands queues in the associated SQ. On one embodiment, the storage for the heads of the SQs may be volatile memory as described above (e.g., DRAM). The first arbiter is responsible for populating the next commands in the internal FIFO, while prioritizing the empty FIFOs. The second arbiter takes smarter decision for command fetching (from the small FIFO) and execution scheduling. The second arbiter also considers the content of the commands held in the internal FIFO for making smarter decisions. The winning commands go to the command parser for execution.

In one embodiment, based upon the current workload, the controller may bypass the scheme and fetch commands directly from the host SQs and schedule the commands. For low queue depth cases, the bypass may be valuable to shorten latency as much as possible.

Figure 9:
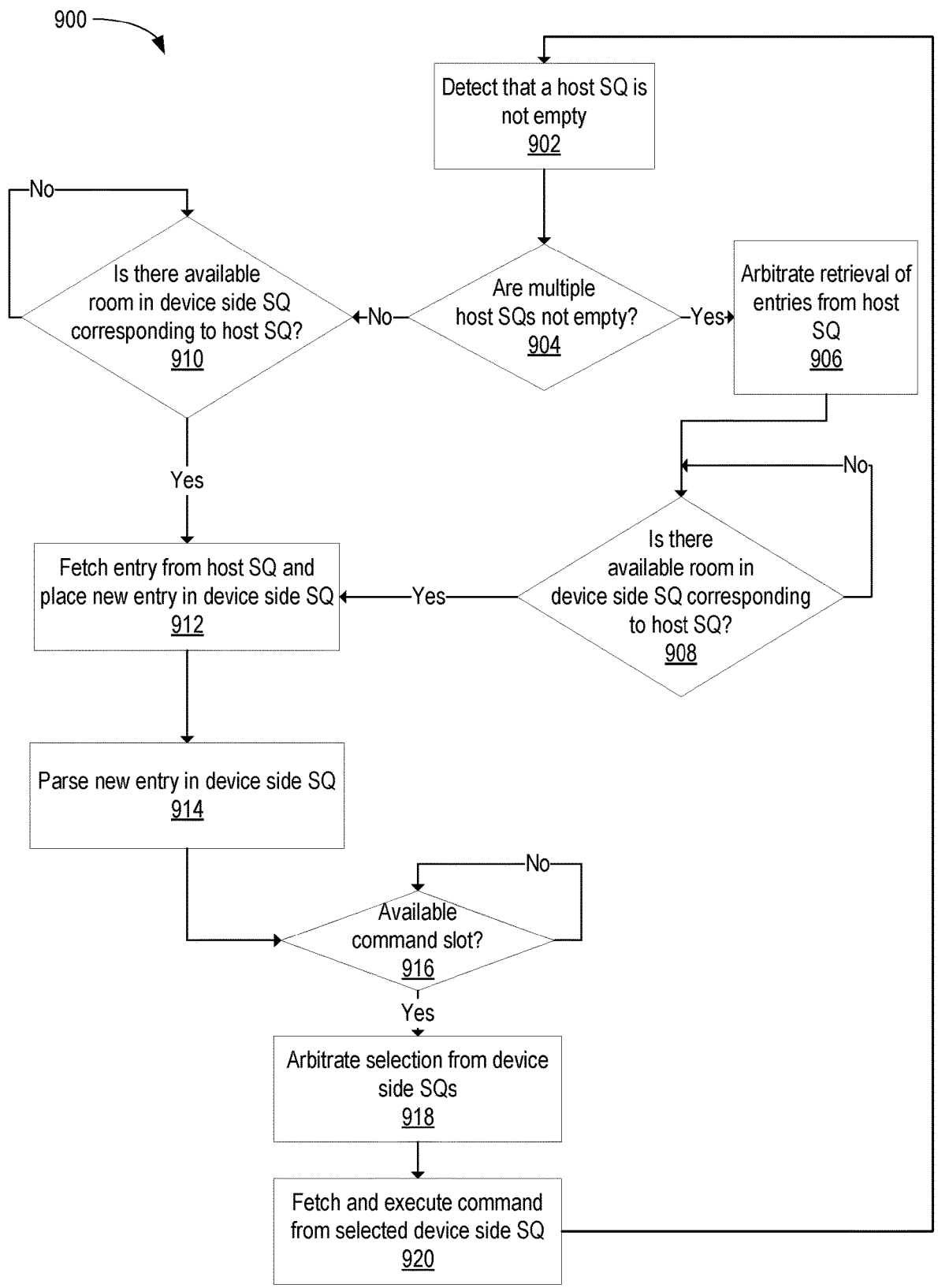
FIG. 9 is a flowchart illustrating a method for a first arbitration scheme, according to certain embodiments.

FIG. 9 is a flowchart illustrating a method for a first arbitration scheme, according to certain embodiments. The method 900 begins at block 902. At block 902, a controller, such as the device controller 808 of FIG. 8, detects that a host SQ is not empty. At block 904, the controller determines whether multiple host SQ's are not empty. If the controller determines that multiple host SQ's are not empty, then the method 900 proceeds to block 906. At block 906, the controller arbitrates retrieval of entries from host SQ. At block 908, the controller determines whether there is available room in the device side SQ corresponding to the host SQ. If the controller determines that there is not available room in the device side SQ, then the method 900 repeats block 908.

If the controller determines that multiple host SQ's are empty the method 900 proceeds to block 910. At block 910, the controller determines whether there is available room in the device side SQ corresponding to the host SQ. If the controller determines that there is not available room in the device side SQ, then the method 900 repeats block 910. If the controller determines at either block 908 or block 910 that there is available room in the device side SQ, then the method 900 proceeds to block 912. At block 912, the controller fetches an entry from host SQ and places new entry in the device side SQ. At block 914, the controller parses a new entry in the device side SQ.

At block 916, the controller determines if there is an available command slot. If the controller determines there is not an available command slot, then the method 900 repeats block 916. If the controller determines there is an available command slot, then the method 900 proceeds to block 918. At block 918, the controller arbitrates selection from device side SQs. At block 920, the controller fetches and executes a command from a selected device side SQ.

Using the new approach in knowing the content of the next command through the use of head of SQs in the device will result in fairness, consistency, and in increased QoS. The bandwidth variation in the MEND would be much higher using the new approach compared to using previous approaches.

In one embodiment, a data storage device comprises: a memory device; and a controller coupled to the memory device, wherein the controller is configured to: determine that at least one host submission queue (SQ) is not empty; determine that at least one device side SQ has room for at least one entry; determine from which host SQ to retrieve an entry; retrieve at least one entry from the host SQ; place the at least one entry in a device side SQ; determine that a command context slot is open; determine from which device side SQ to retrieve an entry; retrieve an entry from the determined device side SQ; and place the entry in an open command context slot. The determining from which host SQ to retrieve an entry comprises arbitrating between multiple host SQs. The arbitrating comprises populating commands in device side SQs using a first in first out (FIFO) criteria. The controller is configured to parse the at least one retrieved entries from the host SQ. The parsing occurs prior to determining from which device side SQ to retrieve an entry. The parsing comprises obtaining one or more of the following: command type, namespace, logical block address (LBA), transfer size, command priority, special flag, metadata, or security parameters. The determining from which device side SQ to retrieve an entry comprises arbitrating between multiple device side SQs. The arbitrating is based upon parsing of the at least one retrieved entries. The controller comprises a host interface module (HIM). The HIM comprises a command parser, the device side SQs, a first arbiter, and a second arbiter. The first arbiter is configured to perform the determining from which host SQ to retrieve an entry. The second arbiter is configured to perform the determining from which device side SQ to retrieve an entry.

In another embodiment, a data storage device comprises: a memory device; and a controller coupled to the memory device, wherein the controller includes a host interface module (HIM) having a plurality of device side submission queues (SQs), a first arbiter, a second arbiter, and a command parser, wherein the controller is configured to: maintain the plurality of device side SQs that contain each portions of host side SQs, wherein a host SQ, from a host device's perspective, includes entries from the host side SQ and entries from the device side SQ; parse entries in the device side SQ; and arbitrate retrieving entries from the device side SQ based upon the parsing. The first arbiter is distinct from the second arbiter. The first arbiter is configured to operate on a weighted round robin (WRR) strategy. A number of device side SQs is equal to a number of host side SQs. The second arbiter has access to results of the parsing and the first arbiter does not have access to the results of the parsing.

In another embodiment, a data storage device comprises: means to store data; and a controller coupled to the means to store data, wherein the controller is configured to: perform a first arbitration to retrieve less than all entries from a plurality of host side submission queues (SQs), wherein the first arbitration is performed by a first arbiter; place retrieved entries in device side SQs; perform a second arbitration to retrieve an entry from the device side SQs, wherein the second arbitration is performed by a second arbiter distinct from the first arbiter; and place the entry in an open command context slot. The controller is configured to perform parsing of the retrieved entries placed in the device side SQs prior to performing the second arbitration. The controller is configured to turn off an ability to perform the first arbitration, place the retrieved entries, perform the second arbitration, and place the entry in the open command context slot.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine that at least one host submission queue (SQ) is not empty;
determine that at least one device side SQ has room for at least one entry;
determine from which host SQ to retrieve an entry;
retrieve at least one entry from the host SQ;
place the at least one entry in a device side SQ;
determine that a command context slot is open;
determine from which device side SQ to retrieve an entry;
retrieve an entry from the determined device side SQ; and
place the entry in an open command context slot, wherein the determining from which device side SQ to retrieve an entry comprises arbitrating between multiple device side SQs.

2. The data storage device of claim 1, wherein the determining from which host SQ to retrieve an entry comprises arbitrating between multiple host SQs.

3. The data storage device of claim 2, wherein the arbitrating comprises populating commands in device side SQs using a first in first out (FIFO) criteria.

4. The data storage device of claim 1, wherein the controller is configured to parse the at least one retrieved entries from the host SQ.

5. The data storage device of claim 4, wherein the parsing occurs prior to determining from which device side SQ to retrieve an entry.

6. The data storage device of claim 4, wherein the parsing comprises obtaining one or more of the following: command type, namespace, logical block address (LBA), transfer size, command priority, special flag, metadata, or security parameters.

7. The data storage device of claim 1, wherein the arbitrating is based upon parsing of the at least one retrieved entries.

8. The data storage device of claim 1, wherein the controller comprises a host interface module (HIM).

9. The data storage device of claim 8, wherein the HIM comprises a command parser, the device side SQs, a first arbiter, and a second arbiter.

10. The data storage device of claim 9, wherein the first arbiter is configured to perform the determining from which host SQ to retrieve an entry.

11. A data storage device, comprising:
a memory device; and
a controller coupled to the memory device, wherein the controller is configured to:
determine that at least one host submission queue (SQ) is not empty;
determine that at least one device side SQ has room for at least one entry;
determine from which host SQ to retrieve an entry;
retrieve at least one entry from the host SQ;
place the at least one entry in a device side SQ;
determine that a command context slot is open;
determine from which device side SQ to retrieve an entry;
retrieve an entry from the determined device side SQ; and
place the entry in an open command context slot, wherein the controller comprises a host interface module (HIM), wherein the HIM comprises a command parser, the device side SQs, a first arbiter, and a second arbiter, wherein the second arbiter is configured to perform the determining from which device side SQ to retrieve an entry.

12. A data storage device, comprising:
a memory device; and
a controller coupled to the memory device, wherein the controller includes a host interface module (HIM) having a plurality of device side submission queues (SQs), a first arbiter, a second arbiter, and a command parser, wherein the controller is configured to:
maintain the plurality of device side SQs that contain each contain portions of host side SQs, wherein a host SQ, from a host device's perspective, includes entries from the host side SQ, wherein entries from the host side SQ comprise the portions of host side SQs contained in and entries from the device side SQs;
parse entries in the device side SQs; and
arbitrate retrieving entries from the device side SQs based upon the parsing.

13. The data storage device of claim 12, wherein the first arbiter is distinct from the second arbiter.

14. The data storage device of claim 12, wherein the first arbiter is configured to operate on a weighted round robin (WRR) strategy.

15. The data storage device of claim 12, wherein a number of device side SQs is equal to a number of host side SQs.

16. The data storage device of claim 12, wherein the second arbiter has access to results of the parsing and the first arbiter does not have access to the results of the parsing.

17. A data storage device, comprising:
means to store data; and
a controller coupled to the means to store data, wherein the controller is configured to:
perform a first arbitration to retrieve less than all entries from a plurality of host side submission queues (SQs), wherein the first arbitration is performed by a first arbiter;
place retrieved entries in device side SQs;
perform a second arbitration to retrieve an entry from the device side SQs, wherein the second arbitration is performed by a second arbiter distinct from the first arbiter; and
place the entry in an open command context slot.

18. The data storage device of claim 17, wherein the controller is configured to perform parsing of the retrieved entries placed in the device side SQs prior to performing the second arbitration.

19. The data storage device of claim 17, wherein the controller is configured to turn off an ability to:
perform the first arbitration;
place the retrieved entries;
perform the second arbitration; and
place the entry in the open command context slot.

\* \* \* \* \*